(12) United States Patent
Saito

(10) Patent No.: US 9,774,752 B2
(45) Date of Patent: Sep. 26, 2017

(54) IMAGE FORMING APPARATUS WHICH TRANSMITS AN OPERATION SCREEN TO A TERMINAL DEVICE, CONTROL METHOD OF IMAGE FORMING APPARATUS WHICH TRANSMITS AN OPERATION SCREEN TO A TERMINAL DEVICE, AND COMPUTER-READABLE RECORDING MEDIUM

(71) Applicant: Konica Minolta, Inc., Tokyo (JP)

(72) Inventor: Shuta Saito, Tachikawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/160,087

(22) Filed: May 20, 2016

(65) Prior Publication Data

US 2016/0352939 A1     Dec. 1, 2016

(30) Foreign Application Priority Data

May 26, 2015 (JP) ................................ 2015-106796

(51) Int. Cl.
*H04N 1/00* (2006.01)

(52) U.S. Cl.
CPC ..... *H04N 1/00493* (2013.01); *H04N 1/00307* (2013.01); *H04N 1/00411* (2013.01); *H04N 2201/0039* (2013.01); *H04N 2201/0055* (2013.01); *H04N 2201/0075* (2013.01)

(58) Field of Classification Search
None
See application file for complete search history.

(56) References Cited

U.S. PATENT DOCUMENTS

| 2013/0051302 A1 | 2/2013 | Kim | |
|---|---|---|---|
| 2014/0168682 A1* | 6/2014 | Muto | H04N 1/00493 358/1.13 |

FOREIGN PATENT DOCUMENTS

| JP | 2010-503365 A | 1/2010 |
|---|---|---|
| JP | 2010-171649 A | 8/2010 |
| JP | 2011-514761 A | 5/2011 |
| JP | 2014-121031 A | 6/2014 |
| JP | 2014-524712 A | 9/2014 |
| JP | 2015-033081 A | 2/2015 |
| JP | 2015033081 A * | 2/2015 |
| WO | WO 2009/041759 A1 | 4/2009 |
| WO | WO 2009/114621 A2 | 9/2009 |
| WO | WO 2014/130893 A2 | 8/2014 |

* cited by examiner

*Primary Examiner* — Andrew H Lam
(74) *Attorney, Agent, or Firm* — Baker & Hostetler LLP

(57) ABSTRACT

An image forming apparatus according to the present invention validates beam forming for a terminal device being a transmission destination when transmitting a second type operation screen capable of receiving an operation instruction with regard to a gesture operation by a user to a terminal device wirelessly connected on a remote panel mode.

16 Claims, 11 Drawing Sheets

FIXED OPERATION SCREEN (FIRST TYPE OPERATION SCREEN)

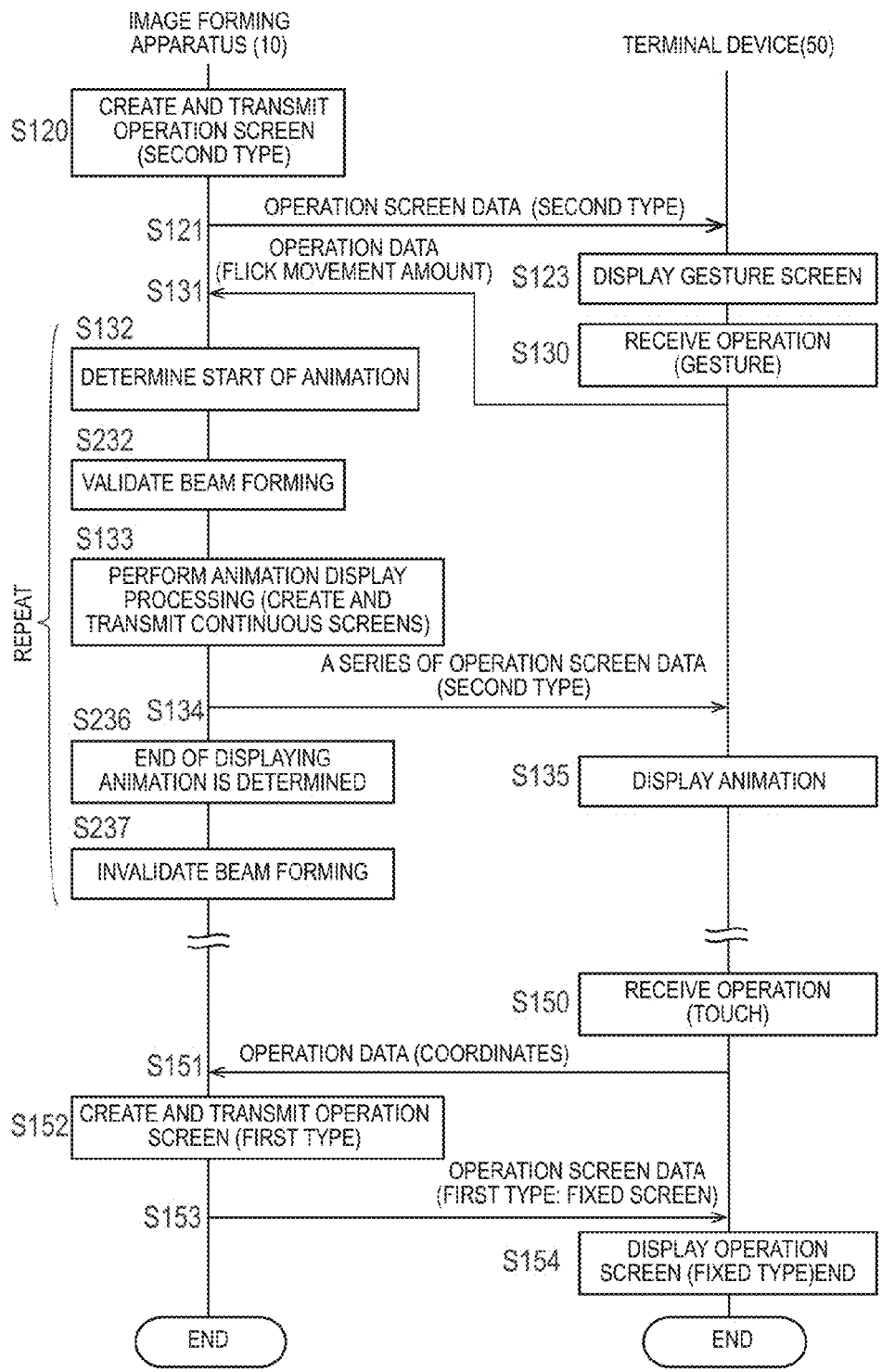

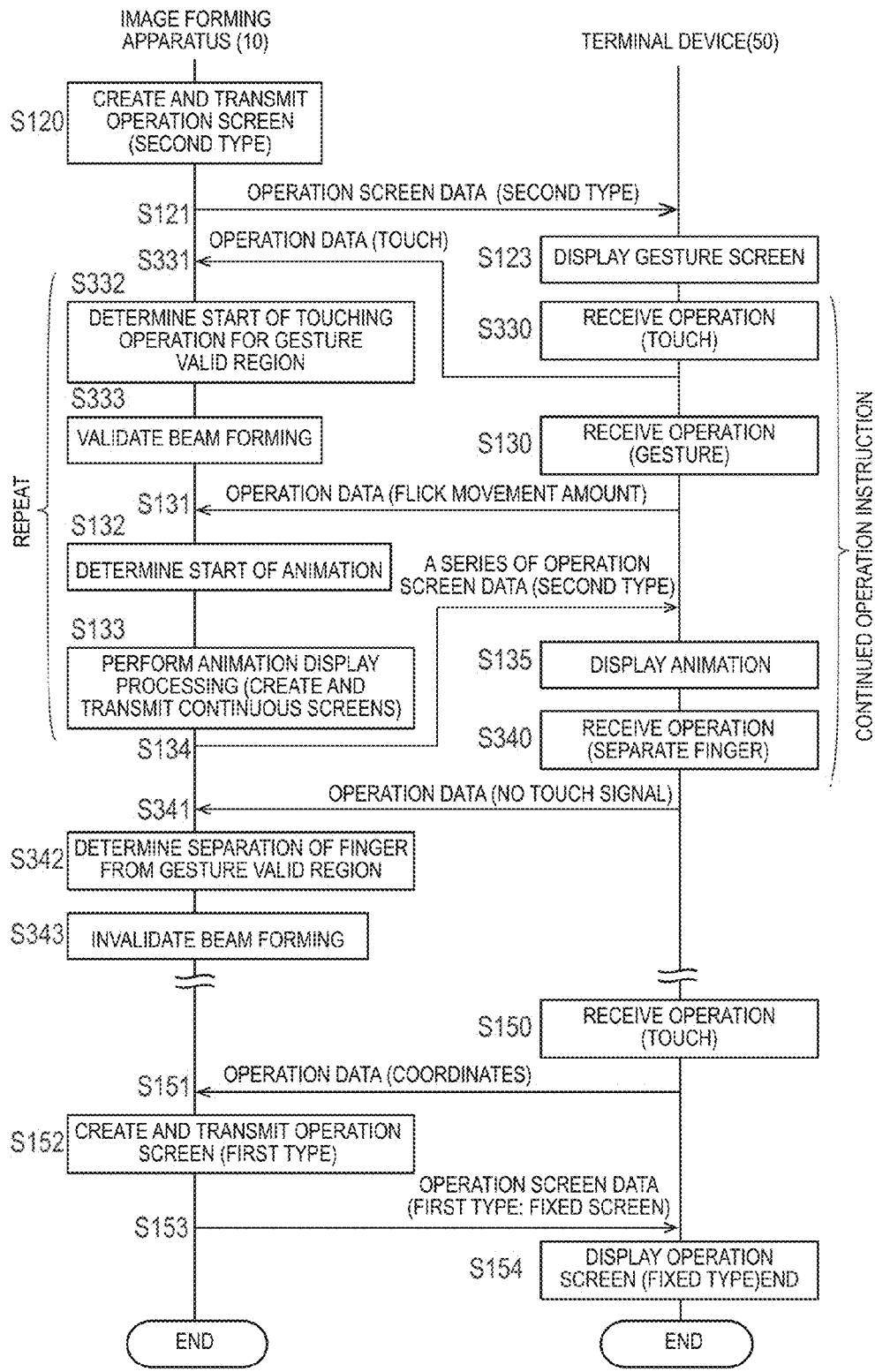

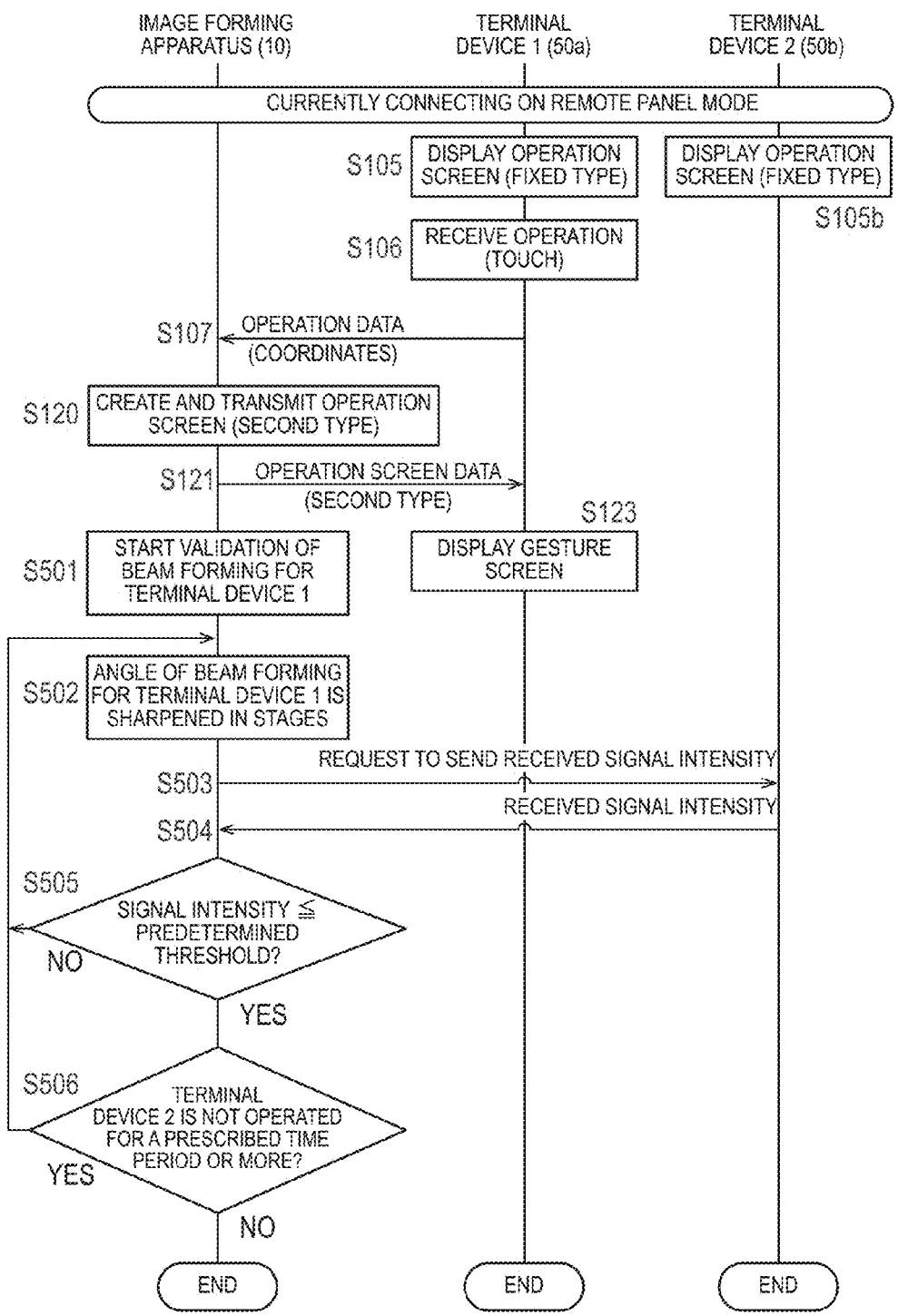

IMAGE FORMING APPARATUS WHICH TRANSMITS AN OPERATION SCREEN TO A TERMINAL DEVICE, CONTROL METHOD OF IMAGE FORMING APPARATUS WHICH TRANSMITS AN OPERATION SCREEN TO A TERMINAL DEVICE, AND COMPUTER-READABLE RECORDING MEDIUM

CROSS-REFERENCE TO RELATED APPLICATIONS

This application is entitled to and claims the benefit of Japanese Patent Application No. 2015-106796 filed on May 26, 2015, the contents of which are incorporated herein by reference in its entirety.

BACKGROUND

Technical Field

The present invention relates to an image forming apparatus and a control method of an image forming apparatus.

Description of Related Arts

In recent years, mobiles terminal devices, such as a smart phone and a tablet terminal, have been used widely. Files edited with these terminal devices can be wirelessly transmitted to image forming apparatuses, such as MFP (Multi-Function Peripherals), and can be processed such as printed and saved in the image forming apparatuses. A file, such as the image data of a document read by a scanner of an image forming apparatus can be transmitted to a terminal device and can be edited with the terminal device.

In order to perform operation of an image forming apparatus on a wirelessly-connected terminal device side, there is a technique called a remote panel control. In the remote panel control, the image data of an operation screen displayed on an operation panel on an image forming apparatus side is transmitted to a terminal device, and the terminal device which has received the image data displays the operation screen on an operation panel. Then, a user can operate the image forming apparatus via an operation onto the operation panel. At this time, based on operation information which has been sent from the terminal device and shows an operation position onto the operation panel, the image forming apparatus creates an operation screen at the next hierarchy and transmits the crated operation screen to the terminal device, or executes processing, such as print operation in accordance with the operation position.

Smart phones, tablet terminals, and the like make it possible to receive gesture operations, such as flick and drag, in order to enhance operability. The gesture operation is used at the time of instructing scrolling, enlarging, and reducing a screen in response to a change of a touch position of fingers of a user. In Patent Document 1 (Japanese Unexamined Patent Publication No. 2015-033081), also in a remote panel control, multiple operation screens are consecutively created on the image forming apparatus side such that an operation screen on an operation panel of a terminal device changes little by little consecutively in response to a gesture operation by a user, and then, the multiple operation screens are displayed in real time on the operation panel of the terminal device (hereafter, referred to as "animation display"). In Patent Document 1, when creating operation screens for animation display, a MFP main body is made not to become overload. In concrete terms, a load condition of the MFP main body is measured. In the case where the load exceeds a threshold, an operation screen incapable of performing a gesture operation for a terminal device is transmitted, and in the case where the load does not exceed the threshold, an operation screen capable of performing a gesture operation is transmitted.

In the technique disclosed by Patent Document 1, any one of a operation screen incapable of performing a gesture operation and an operation screen capable of performing a gesture operation is transmitted from an image forming apparatus to a terminal device. In the operation screen incapable of performing a gesture operation, at the time of transmitting an operation screen, it is permissible to transmit a single operation screen in response to a single operation instruction by a user. On the other hand, at the time of displaying animation such as scrolling on a terminal device in response to a gesture operation, in order to display an image so as to be scrolled smoothly, it is necessary to transmit operation screens consecutively, for example, at a rate of 20 to 30 frames per second without intermission. In order to perform such animation display, in wireless communication, a wide communication band is required.

Patent Document 1 discloses a technique to control an MFP side so as not to become overload at the time of displaying animation, but considers nothing about a shortage of bands at the time of transmitting operation screens consecutively without intermission.

The present invention has been achieved in view of the above-mentioned circumstances, and an object of the present invention is to obtain an image forming apparatus which secures communication speed without causing any trouble for animation display processing in the case where an operation screen capable of receiving an operation instruction with regard to a gesture operation is transmitted to a terminal device.

SUMMARY

In order to realize at least the above-mentioned object, an image forming apparatus reflecting one aspect of the present invention is an apparatus which transmits an operation screen on a remote panel mode via wireless communication to a terminal device wirelessly connected and is able to perform operation in response to an operation instruction which is made to the operation screen and received from the terminal device.

The image forming apparatus includes a network which wirelessly communicates with one or more terminal devices and is able to execute beam forming for one or more specific terminal devices; and a processor configured to create a first type operation screen to be transmitted on the remote panel mode to a terminal device wirelessly connected and a second type operation screen for which a transfer rate higher than that for the first type operation screen is requested, to receive an operation instruction onto an operation screen displayed on a terminal device via the network, to create a renewed operation screen based on the received operation instruction, and to transmit the renewed operation screen to the terminal device.

Wherein the second type operation screen is an operation screen capable of receiving an operation instruction with regard to a gesture operation by a user from a terminal device, and when the second type operation screen is transmitted to the terminal device via the network, beam forming is validated for the terminal device being a transmission destination.

BRIEF DESCRIPTION OF THE DRAWINGS

FIG. 9 is a diagram showing a temporal flow of information between the image forming apparatus and a terminal device according to the second embodiment.

FIG. 10A is a diagram showing a temporal flow of information between the image forming apparatus and a terminal device according to the third embodiment.

FIG. 11 is a diagram showing a temporal flow of information between the image forming apparatus and two terminal devices according to the fourth embodiment.

DETAILED DESCRIPTION

Figure 1:
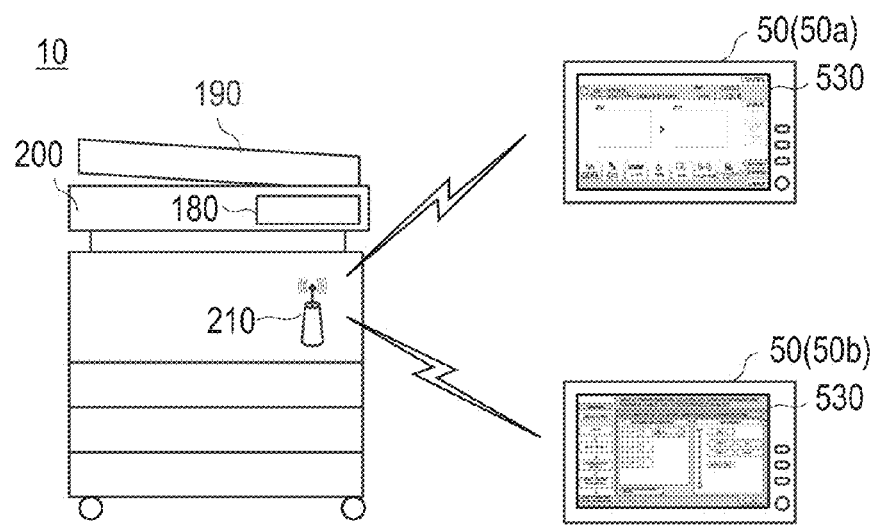
FIG. 1 is a drawing showing an example of an image forming apparatus and terminal devices wirelessly connected to the image forming apparatus.

Hereinafter, an embodiment of the present invention will be described with reference to the attached drawings. In the description of the drawings, the same element is provided with the same reference symbol, and overlapping description is omitted. The dimension ratios in the drawings are exaggerated on account of description. Accordingly, the dimension ratios may be different form the respective actual dimension ratios.

Figure 2:
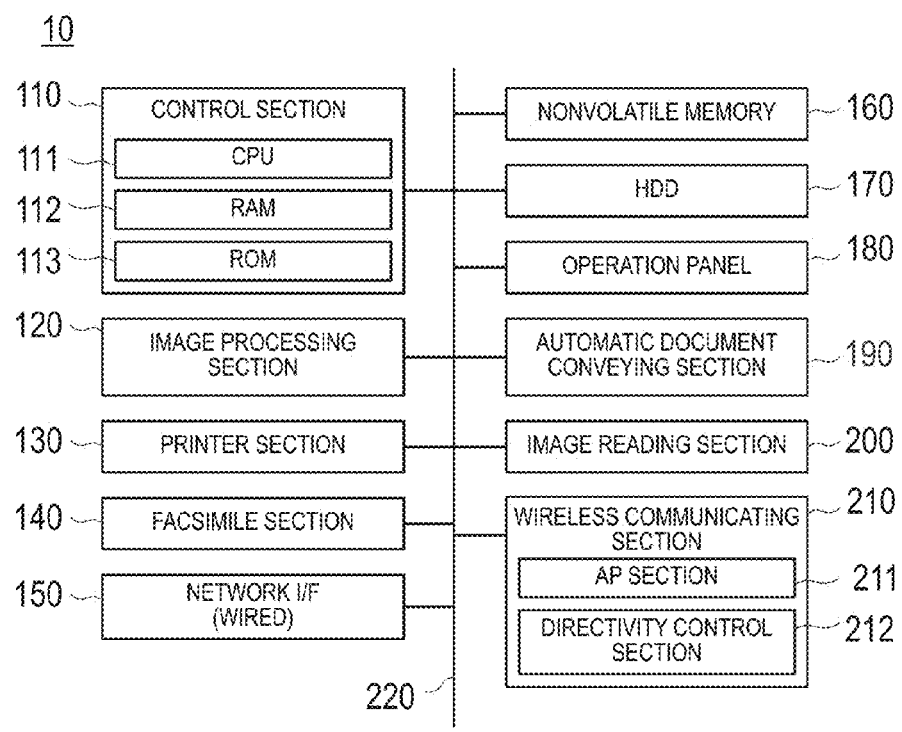
FIG. 2 is a block diagram showing an example of a hardware constitution of the image forming apparatus.
Figure 3:
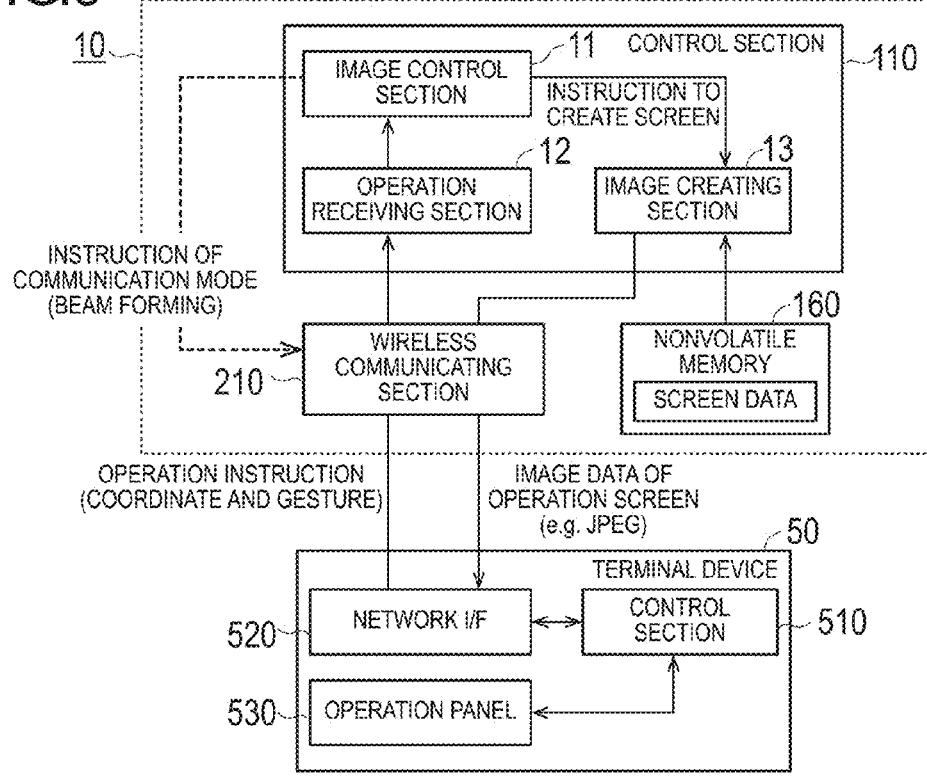
FIG. 3 is a functional block diagram for describing the functions of a control section on a remote panel mode.

FIG. 1 is a drawing showing an example of an outline constitution of an image forming apparatus 10 and terminal devices 50 wirelessly connected to the image forming apparatus 10 according to an embodiment. FIG. 2 is a block diagram showing an example of a hardware constitution of the image forming apparatus 10. FIG. 3 is a functional block diagram describing the functions of a control section 110 on a remote panel mode. Hereinafter, with reference to FIGS. 1 to 3, description is given to the outline constitution of the image forming apparatus 10.

As shown in FIG. 1, the image forming apparatus 10 and a plurality of terminal devices 50 are wirelessly connected to each other via a wireless communicating section 210, which functions as an access point, of the image forming apparatus 10. In the present embodiment, the image forming apparatus 10 is a multifunctional digital composite machine (MFP) equipped with a copy function, a print function, a scanning function, a facsimile function, and so on. The terminal device 50 is a portable mobile device, such as a smart phone and a tablet terminal.

As shown in FIG. 2, the image forming apparatus 10 includes a control section 110, an image processing section 120, a printer section 130, a facsimile section 140, a network I/F (interface) 150, a nonvolatile memory 160, a HDD 170, an operation panel 180, an automatic document conveying section 190, an image reading section 200, and a wireless communicating section 210. These sections are connected to each other via signal lines 220.

The control section 110 includes a CPU (central processing unit) 111, a RAM 112, a ROM 113, and so on. Each of functions mentioned later is realized in such a way that the CPU 111 reads out a program corresponding to it from the ROM 113, develops the program into the RAM 112, and executes the program.

The image processing section 120 applies image processing, such as image correction and rasterizing processing to image data received by the facsimile section 140 or the network I/F 150 or to image data obtained by reading a document by the image reading section 200 and converts the image data into print data. The converted print data is sent to the printer section 130 so that a full color image is formed on a surface of a sheet with respective color materials of Y, M, C, and K colors, such as toners and inks.

The network I/F 150 is an interface to communicate with external devices through cables via a network N, and uses a standard, such as Ethernet (registered trademark) and FDDI.

The nonvolatile memory 160 stores various types of data. The image data of the whole image of an operation screen mentioned later and the image data of each of objects, such as operation buttons, icons, and characters which constitute the operation screen, are stored in the nonvolatile memory 160.

The HDD 170 is a storage device with a large capacity and stores image data received by the network I/F 150 and so on.

The operation panel 180 includes a display constituted by a liquid crystal panel or the like, and displays setting conditions and information such as an executing state of a print job. Further, the operation panel 180 includes hard keys and a touch sensor superimposed on a display surface, and receives an operator instruction of a user via these components.

The automatic document conveying section 190 is disposed on an upper portion of the image forming apparatus 10 (refer to FIG. 1), and includes a document stacking section. Document sheets placed on the document stacking section are separated one sheet by one sheet, and conveyed up to a read-in position of the image reading section 200.

The wireless communicating section 210 includes an AP (Access Point) section 211 and a directivity control section 212.

The AP section 211 is constituted by, for example, a wireless LAN module, and makes the wireless LAN module function as an access point so that the AP section 211 can communicate wirelessly with external terminal devices 50 via a network by using techniques such as wireless protocols in accordance with, for example, IEEE802.11 standards. The AP section 211 includes a plurality of antennas, and can execute beam forming for a specific terminal device 50.

The directivity control section 212 performs an arithmetic operation on a basis of control of the control section 110 in order to execute beam forming for the specific terminal device 50. The beam forming is performed by using the existing technique, such as IEEE802.11ac standards. In the beam forming, the directivity of a beam is controlled such that a radio field intensity becomes the strongest at a geographic position where a terminal device 50 becoming a target is placed. For example, based on a sounding frame received from a specific terminal device 50 becoming a target, a channel state is calculated, and then, the phase and amplitude of a radio wave output from each of the antennas are adjusted such that a radio field intensity becomes strong at the terminal device 50 (implicit feedback). Alternatively, in the case where the terminal device 50 side corresponds, the following techniques may be taken as more accurate beam forming. Based on a sounding frame transmitted by the AP section 211, a channel state is calculated on a terminal device 50 side, and then, the AP section 211 having received this adjusts the phase and amplitude of a radio wave output from each of the antennas based on the channel state (explicit feedback).

As shown in FIG. 3, the control section 110 functions as an image control section 11, an operation receiving section 12, and an image creating section 13. The control section 110 transmits the image data of an operation screen to a terminal device 50 wirelessly connected on a remote panel mode. This operation screen is created by the image creating section 13 on a basis of an instruction of the image control section 11. The operation screen to be transmitted to the terminal device 50 is basically common to an operation screen displayed on the operation panel 180 of the image forming apparatus 10. On the remote panel mode, the terminal device 50 functions as a remote panel in place of the operation panel 180. A user is allowed to instruct operation via this operation screen displayed on the terminal device 50, whereby the user can make setting and operation for various types of functions of the image forming apparatus 10. When starting the remote panel mode, the image control section 11 makes the image creating section 13 create a default initial operation screen. The initial operation screen may be any one of a first type operation screen and a second type operation screen each mentioned later. The image creating section 13 creates various types of operation screens by combining an operation screen and objects constituting the operation screen, which are stored in the nonvolatile memory 160. The image control section 11 transmits the created operation screen to the terminal device 50 via the wireless communicating section 210.

The terminal device 50 displays an operation screen on the display surface of the operation panel 530 based on the image data of the operation screen received by the network I/F 520. This image data is image data, for example, in the JPEG format or the TIFF format.

Figure 4:
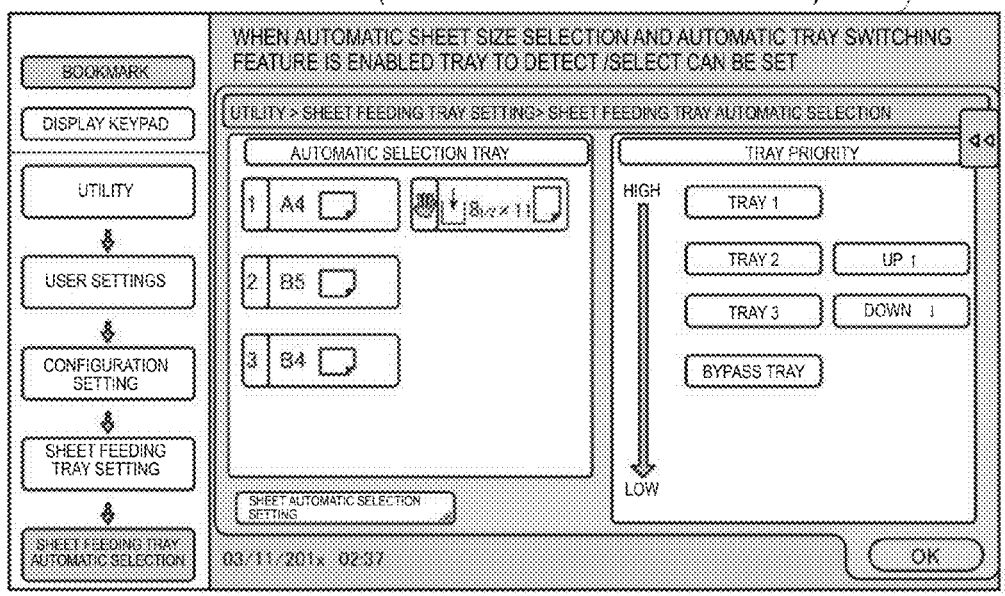
FIG. 4 is an example of an operation screen (a first type) displayed on an operation panel of a terminal device.
Figure 5:
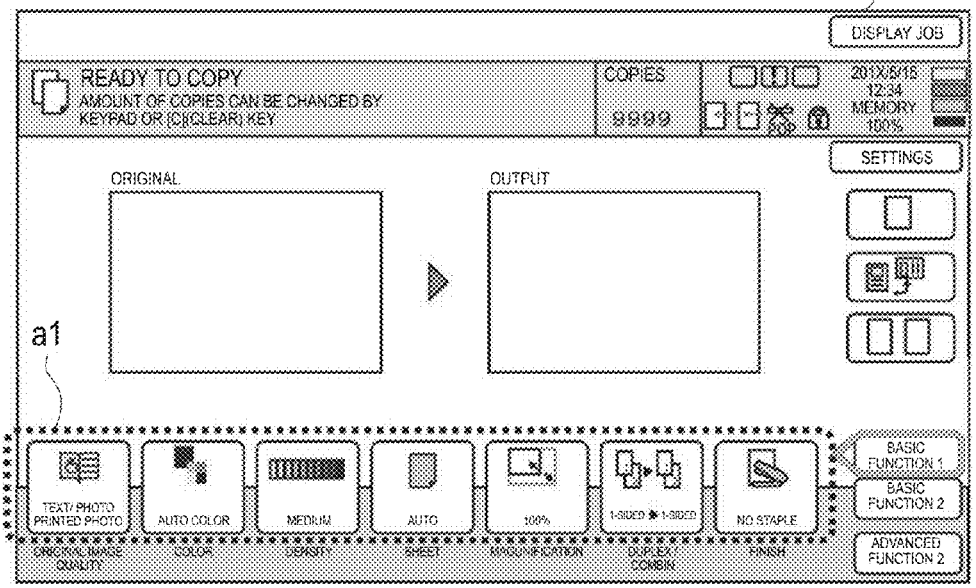
FIG. 5 is an example of an operation screen (a second type) displayed on an operation panel of a terminal device.
Figure 6:
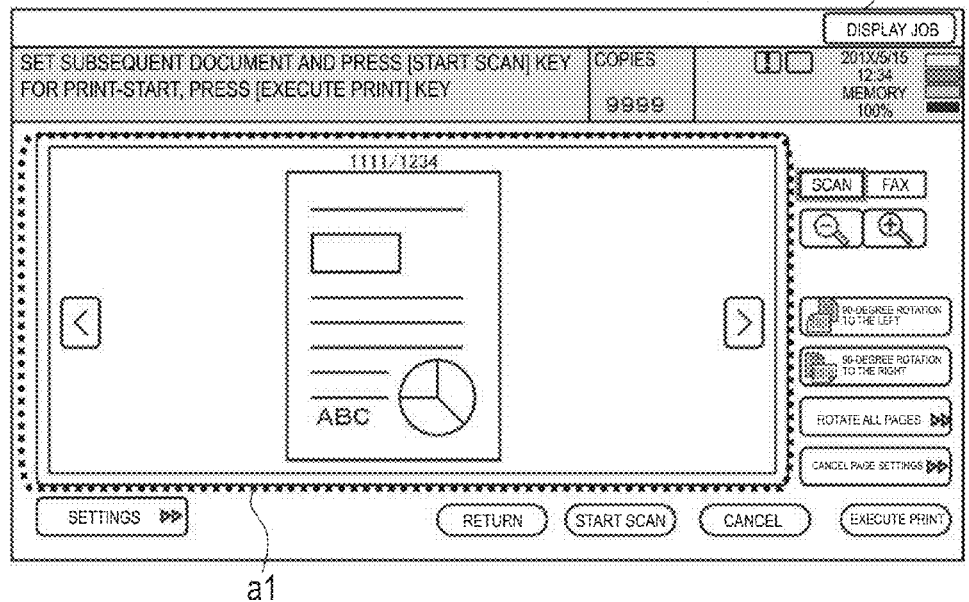
FIG. 6 is an example of an operation screen (a second type) displayed on an operation panel of a terminal device.

FIG. 4 to FIG. 6 each shows an example of the operation screen displayed on the operation panel 530 of the terminal device 50. The operation screen shown in FIG. 4 is an operation screen (hereafter, referred to as a "fixed operation screen") fixed as a "first type operation screen", and objects, such as operation buttons displayed on the operation screen, are fixedly arranged and not movable.

The operation screen shown in each of FIG. 5 and FIG. 6 is a "second type operation screen", and is an operation screen (hereafter, referred to as a "gesture screen") where a part or the whole of the operation screen is displayed with animation such as scrolling etc. in response to a gesture operation by a user. A valid region al in each of FIGS. 5 and 6 is a region where animation display is performed, and is a region where a gesture operation within the region is determined as valid. In the case where the image forming apparatus 10 receives a gesture operation of a user within the valid area al, the icon of an operation button displayed on the valid area al of the operation screen is displayed with animation in response to the operation.

In the case where a user operates any one of objects on the first or second type operation screen displayed on such an operation panel 530, the touch sensor of the operation panel 530 detects the coordinates or the coordinates and movement of the operation. The control section 510 transmits the operation data (coordinates etc.) to the image forming apparatus 10 via the network I/F 520. The operation receiving section 12 analyzes the received operation data, and specifies the type and operation position of the operation from the operation data. Examples of the type of an operation include a touch operation (also called a tap operation) which pushes a touch panel a single time with a finger, and a gesture operation. The gesture operation includes a flick operation and a drag operation. The flick operation is an operation which flips a finger in a state that the finger touches lightly a touch panel, and the drag operation (also called a swipe operation) is an operation which slides a finger in a state that the finger touches lightly a touch panel.

The image control section 11 determines a renewed operation screen to be displayed next based on the currently displayed operation screen, i.e., the operation screen transmitted to the terminal device 50 at the end, and the type information and position information of an operation received by the operation receiving section 12. When the fixed operation screen as shown in FIG. 4 is displayed, in the case of receiving a depressing operation (a touch operation) to the coordinates corresponding to the arrangement position of an operation button, the operation screen is renewed to an operation screen after the processing corresponding to the operation button. Examples of the operation screen after the renewing include an operation screen of a lower hierarchy than the operation screen shown in FIG. 4 and an operation screen in which a pop screen is made to superimpose on the operation screen shown in FIG. 4.

When the gesture screen as shown in FIG. 5 is displayed, in the case of receiving a gesture operation to the valid area al, an object in the valid region al is displayed with animation in the direction or at a moving speed corresponding to the operation. An operation to an operation button other than the valid area al performs the same processing as the fixed operation screen. Even if a gesture operation of a user is input to an image region other than the valid region al, the operation is determined as invalid by the terminal device 50 or the operation receiving section 12. As the animation display, in concrete terms, each object, such as an operation button and a thumbnail image is scrolled in a prescribed direction (in the example shown in FIG. 5, in a lateral direction). At this time, by the scrolling, an object is erased into the outside of the display region. Alternatively, a new object is made to appear from the outside of the display region. When performing this animation display, in order to show a motion of a screen smoothly, it is necessary to renew the operation screen in real time at 20 to 30 frames per second.

That is, in the first type operation screen, it is enough to create and transmit an operation screen composed of a single frame for each time when a single operation of a user is received. In contrast to this, in the second type operation screen, in order to perform animation display in response to a single gesture operation from a user, it is necessary to create and transmit a series of operation screens composed of multiple frames. Namely, in order to secure stably a smooth motion with animation display, the second type operation screen is requested to use a transfer rate (a fast communication speed) higher than that in the first type operation screen.

In the present embodiment, in the case of transmitting the second type operation screen to the terminal device 50, that is, in the case of transmitting operation screens consecutively in order to perform animation display immediately after, the image control section 11 controls the wireless communicating section 210 so as to validate beam forming for a terminal device 50 of a transmission destination. FIGS.

Figure 7A:
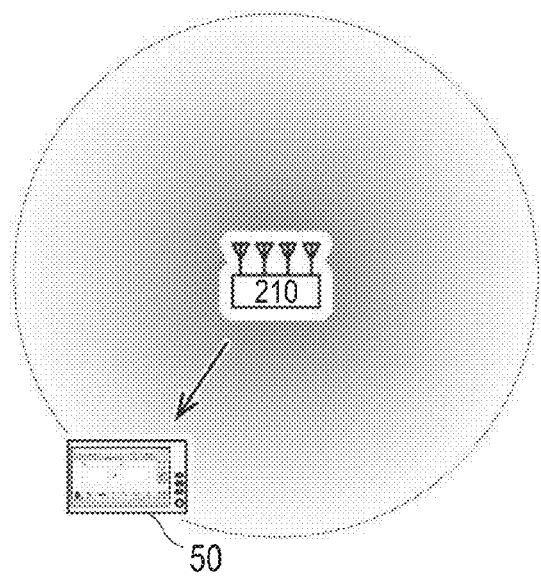
FIG. 7A is a conceptual drawing of beam forming.
Figure 7B:
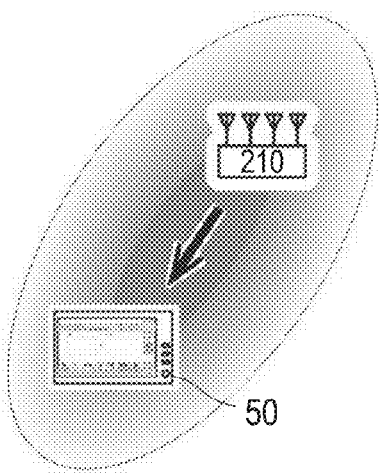
FIG. 7B is a conceptual drawing of beam forming.

7A and 7B each is a conceptual illustration of beam forming. At an ordinary time when beam forming is not valid, as shown in FIG. 7A, the wireless communicating section 210 of the image forming apparatus 10 transmits non-directional transmission radio wave. On the other hand, as shown in FIG. 7B, when beam forming for a terminal device 50 is made valid, the wireless communicating section 210 adjusts the phase and amplitude of radio wave output from each of multiple antennas of the AP section 211 such that a received signal intensity becomes the highest at the geographic position of the terminal device 50. That is, an angle of the beam forming is sharpened such that the received signal intensity of the terminal device 50 becomes the highest. With this, the received signal intensity received by the terminal device 50 becomes higher and an S/N ratio becomes large, whereby it becomes possible to increase a maximum transfer rate.

In this way, in the case of transmitting the second type operation screen to a terminal device 50, beam forming for the terminal device 50 of a transmission destination is made valid. With this, in the case of performing animation display processing which transmits the second type operation screens consecutively in response to a gesture operation and displays them, it becomes possible to secure a communication speed without causing trouble in the animation display processing. Further, it becomes possible to transmit image data stably in real time, whereby smooth animation display can be performed.

First Embodiment

Figure 8:
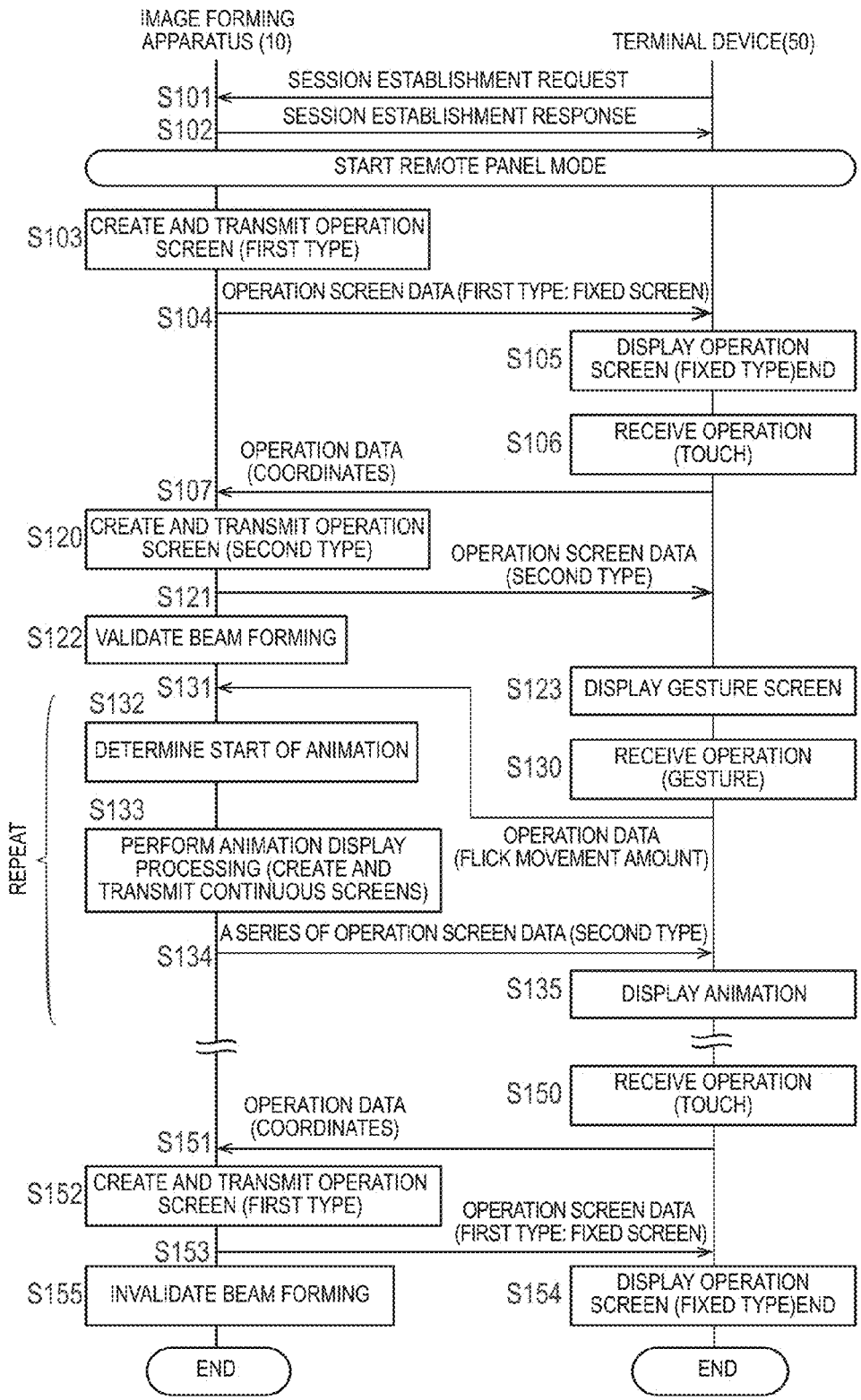
FIG. 8 is a diagram showing a temporal flow of information between the image forming apparatus and a terminal device according to the first embodiment.

FIG. 8 is a diagram showing a temporal flow of information between the image forming apparatus 10 and a terminal device 50 according to the first embodiment.

First, the image forming apparatus 10 receives a session establishment request from the terminal device 50 wirelessly connected on a remote panel mode (S101). In response to this request, the image forming apparatus 10 transmits a session establishment response to the terminal device 50 (S102). At the time of performing the establishment request, authentication processing may be performed by using information, such as ID of the terminal device 50 or a user who uses the terminal device 50 and a personal identification number. By performing the processing at Step S102, hereinafter, the image forming apparatus 10 and the terminal device 50 become a wireless connection state with the remote panel mode.

Successively, the control section 110 of the image forming apparatus 10 creates default initial operation screen data (the first type) and transmits it (S103, S104). The terminal device 50 displays the received fixed operation screen on the operation panel 530 (S105).

When the terminal device 50 receives an operation from a user (S106), the terminal device 50 transmits operation data (herein, coordinates) corresponding to the operation to the image forming apparatus 10 (S107).

The operation receiving section 12 of the control section 110 specifies an operation position by analyzing the operation data. The image control section 11 specifies an operated operation button based on the relationship between the operation position and the operation screen currently displayed on the terminal device 50. At this time, if the operation button operated by a touch at Step S106 is an operation button to transfer to the second type operation screen (a gesture screen) capable of receiving a gesture operation, the image control section 11 makes determination to switch the operation screen to be transmitted to the terminal device 50 to the second type operation screen. With this determination, the image control section 11 makes the image creating section 13 create the second type operation screen, and makes the wireless communicating section 210 transmit the image data of the created operation screen to the terminal device 50 (S120, S121). Further, in parallel to the transmitting of the second type operation screen to the terminal device 50, the image forming apparatus 10 starts validation of beam forming for this terminal device 50 (S122). The processing to validate beam forming is performed as mentioned above. Namely, based on a sounding frame transmitted or received, a channel state is calculated, and then, the radio wave output condition (phase, amplitude) of each of multiple antennas of the AP section 211 is adjusted such that a radio field intensity on the terminal device 50 side becomes strong.

In parallel to this validation processing of the beam forming, the terminal device 50 displays a received gesture screen (S123).

Successively, when a gesture operation by a user is received to the valid region al (refer to FIG. 5 and FIG. 6) (S130), operation data (herein, a flick movement amount) in response to the operation is transmitted to the image forming apparatus 10 (S131).

Based on the analysis result of the operation data by the operation receiving section 12, the image control section 11 of the control section 110 confirms such that the received operation information is an operation made within the valid region al and the type of the operation is a gesture operation relating to a flick operation. With this, it is determined that a current timing is a timing to start animation (S132).

Based on the determination at Step S133, animation display processing is performed (S133). In the animation display processing, in response to a single gesture operation, a series of consecutive operation screens are transmitted to the terminal device 50, and these operation screens are displayed in real time on the terminal device 50. In concrete terms, an operation screen composed of a single frame is created by composing an image of a movable object such as an operation button within a gesture valid region al of a gesture screen and images of peripheral objects other than the movable object. Then, multiple operation screens are created while moving the movable object little by little, and the multiple operation screens are transmitted consecutively at a rate of 20 to 30 frames per second to the terminal device 50 (S134). In the terminal device 50, the received multiple operation screens are displayed in real time on the operation panel 530, thereby performing animation display. The animation display processing may be stopped with the end of the scrolling. The end of the scrolling is set at a time after the scrolling has been made for a predetermined period (for example, one to three seconds) in response to a single flick operation or at a time when a touch operation by a user is received to the operation screen in the course of the scrolling. The total moving distance and moving speed of each object may be set appropriately in accordance with a flick movement amount. For example, in the case where a quick flick operation is made, a movement amount of an object for each operation screen is made larger such that the moving speed of the object becomes faster.

In the case of the gesture screen shown in FIG. 5, in response to a gesture operation, many operation buttons are displayed sequentially with scrolling on the valid region al. A user repeats control at Steps S130 to S135 until a desired operation button appears within the valid region al. When a desired operation button is found, a user performs a touch operation to this operation button (S150).

Based on the analysis result of the operation data (herein, coordinates), similarly to the above, the image control section 11 of the image forming apparatus 10 confirms that a specific operation button has been selected (S151). With this, the image control section 11 makes determination to switch the operation screen to be transmitted to the terminal device 50 from the second type operation screen to the first type operation screen. With this determination, the image control section 11 makes the image creating section 13 create the first type operation screen, and makes the wireless communicating section 210 transmit the image data of the created operation screen to the terminal device 50 (S152, S153). The terminal device 50 displays the received fixed operation screen on the operation panel 530 (S154). At the same time with the transmitting of the first type operation screen to the terminal device 50, the image forming apparatus 10 invalidates the beam forming for this terminal device 50 (S155).

In this way, in the first embodiment, when an operation screen to be transmitted to a terminal device is switched to the second type operation screen, validation of beam forming is started, and when an operation screen is switched from the second type operation screen to the first type operation screen, beam forming is invalidated. With this, in the first embodiment, when an operation instruction to start animation display processing is received (S131), since beam forming has been already validated, in addition to the above-mentioned effects, it is possible to obtain an effect that animation display processing can be started immediately.

Second Embodiment

FIG. 9 is a diagram showing a temporal flow of information between the image forming apparatus 10 and a terminal device 50 according to the second embodiment. As described hereinafter, in the second embodiment shown in FIG. 9, as compared with the first embodiment shown in FIG. 8, a timing to validate and invalidate beam forming differs. In FIG. 9 and the diagrams subsequent to FIG. 9, processing common with that in FIG. 8 is provided with the same sign, thereby omitting description for it.

In the second embodiment shown in FIG. 9, determination to start animation at Step S132 is made as a trigger such that beam forming for a terminal device 50 becoming a target is validated (S232).

Subsequently, the validated beam forming is invalidated (S237) at a time when the end of animation processing based on a single gesture operation is determined (S236). With regard to the determination of the end of the animation display processing, as mentioned above, after the animation display processing with scrolling has been started upon receipt of a flick operation as a single gesture operation, when a prescribed time period has elapsed, the end may be determined. Alternatively, before a prescribed time period has elapsed, when a touch operation by a user is received to the operation screen in the course of scrolling, the end may be determined.

In this way, in the second embodiment, in response to a single gesture operation, operation screens are transmitted consecutively. Further, in response to the start and end of the animation display processing to display the operation screens, beam forming is validated and invalidated. The image forming apparatus 10 can be wirelessly connected to a plurality of terminal devices 50 simultaneously via the AP section 211. When the image forming apparatus 10 is wirelessly connected to a plurality of terminal devices 50 simultaneously, if beam forming is performed for one terminal device among them, for each of the other terminal devices 50 which are using the same channel, a reception sensitivity falls. As a result, it may give adverse effects, such as a fall of a communication speed. In the second embodiment, beam forming is validated only during a period of performing the animation display processing in response to a single gesture operation. With this, it becomes possible to obtain an effect to minimize influence to terminal devices other than a terminal device becoming a target of beam forming.

Third Embodiment

Figure 10B:
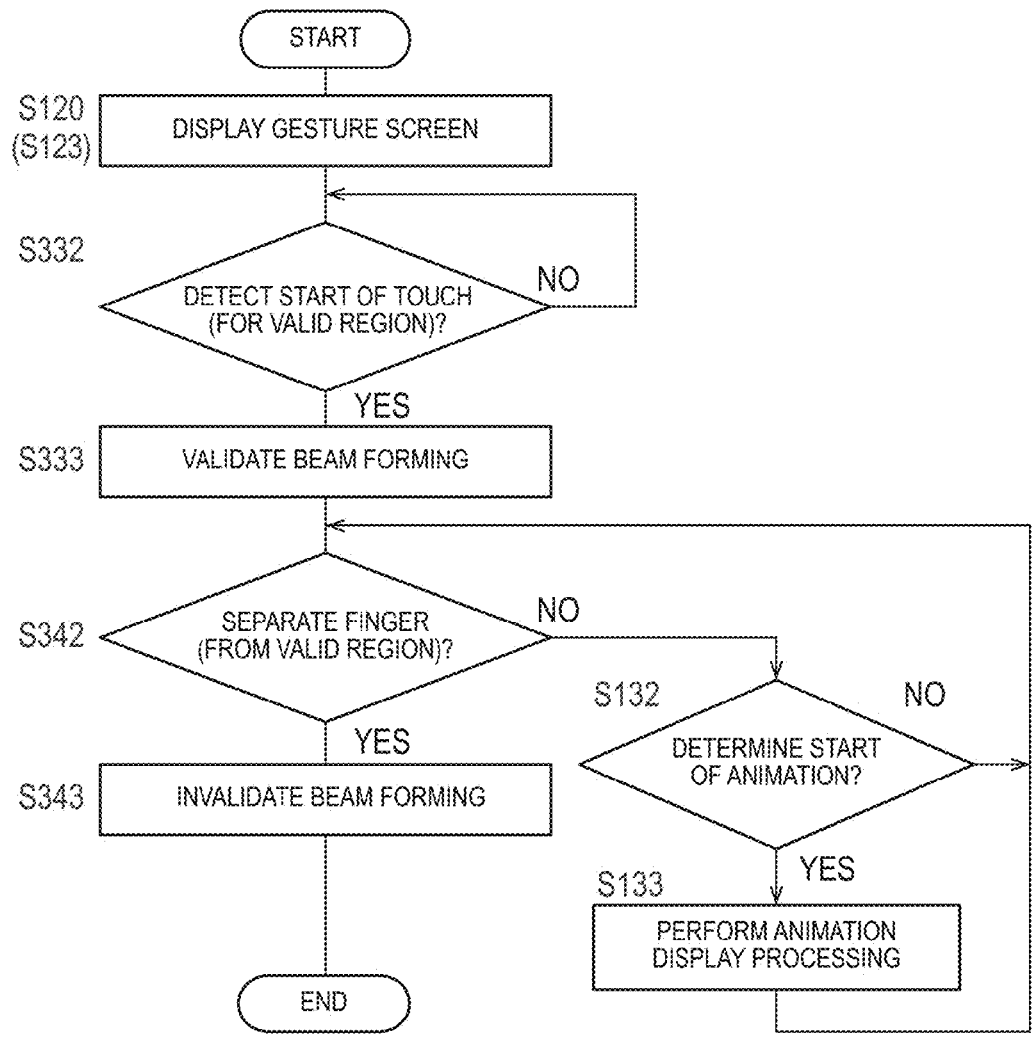
FIG. 10B is a flow chart showing a part of the processing shown in FIG. 10A.

FIG. 10A is a diagram showing a temporal flow of information between the image forming apparatus 10 and a terminal device 50 according to the third embodiment. FIG. 10B is a flow chart for describing a part of the processing shown in FIG. 10A. In FIGS. 10A and 10B, processing common with that in FIG. 8 and FIG. 9 is provided with the same sign, thereby omitting description for it.

In the third embodiment, when a touch operation is input by a user as the first input of a series of gesture operations and the operation receiving section 12 analyzes this input as a touch operation for a valid region al (S330 to S332), beam forming is validated (S333). Successively, similarly to FIG. 8, processing at each of steps S130 to S135 is executed.

Then, at the subsequent Step S340, when an operation to separate a user's finger from the valid region al is made (or, when an operation to slide a finger to the outside of the valid region al is made), the operation receiving section 12 which has received the operation data determines such that the finger is separated from the valid region al (S341, S342). Based on this determination, the image control section 11 invalidates beam forming (S343). At this time, if the animation display processing at Step S133 is being continued, after waiting the end of the animation display processing, beam forming is switched to invalid.

FIG. 10B is a flowchart for describing the processing on the image forming apparatus 10, and supplemental description is given to a continued operation instruction. The terminal device 50 transmits operation information in a touch state of a user onto the operation panel 530 with a predetermined cycle. If there is no change in touch and its coordinates among multiple pieces of operation information received consecutively, the operation receiving section 12 determines such that the user's finger comes in contact with the operation panel 530 continuously. After touching with a finger has been detected at the first time (S332) and beam forming has been validated (S333), the user keeps the finger as it is and performs a gesture operation without separating the finger once. Thereby, when the start of animation is determined (S132: YES), animation display processing is executed (S133).

On the other hand, when a user separates the finger as it is without performing a gesture operation (S342: YES), beam forming is invalidated as it is without executing animation display processing (S343).

In the third embodiment, when a touch operation onto a valid region by a user is started, beam forming is switched to valid, and when the touch operation is ended, the beam forming is switched to invalid. With this, an intermediate effect between the first embodiment and the second embodiment can be acquired. That is, a period of validating beam forming can be made shorter than the first embodiment, and the validation processing of beam forming is started at a timing earlier than that in the second embodiment. Accordingly, a response until the start of an animation display processing can be made faster.

(Case of being Wirelessly Connected to a Plurality of Terminal Devices Simultaneously)

It is possible for the image forming apparatus 10 to be wirelessly connected to two or more terminal devices 50 simultaneously on a remote panel mode. At that time, in the case where beam forming is validated for one of the terminal devices 50, for the others of the terminal devices 50 which are using the same channel, a received signal intensity falls. As a result, it may give adverse effects, such as a fall of a communication speed. In the fourth to sixth embodiments each explained below, the degree of a sharp angle (the degree of optimization to a target machine) of beam forming or the propriety of validation is determined while considering a received signal intensity at the others of the terminal devices 50.

Fourth Embodiment

FIG. 11 is a diagram showing a temporal flow of information between the image forming apparatus 10 and two terminal devices 50 according to the fourth embodiment.

In FIG. 11, two terminal devices of a terminal device 50a (hereafter, called a "terminal device 1") and a terminal device 50b (hereafter, called a "terminal device 2") are wirelessly connected to the image forming apparatus 10 on a remote panel mode through the same session establishment processing as that in FIG. 8.

A fixed operation screen is displayed on each of the respective operation panels 530 of the terminal devices 1 and 2 (S105, S105b). Hereafter, by executing the same processing as that in FIG. 8, the operation panel 530 of the terminal device 1 being one of the two terminal devices is made to display a gesture screen (S106 to S123).

In the image forming apparatus 10, the validation of beam forming for the terminal device 1 is started in parallel to the transmitting of the second type operation screen to the terminal device 1 (S501).

At this time, in an operation to sharpen an angle of a beam for the terminal device 1, the angle is not made immediately into the sharpest angle so as to obtain the largest signal intensity, but made in stages (stepwise) (S502). For example, multi-stage radio wave output conditions (a phase and amplitude in each antenna) are set up at a middle point or at a point between a radio wave output condition at the time of non-direction (a phase and amplitude common for all the antennas) and a radio wave output condition at the time of the optimal (the sharpest angle). Then, from the radio wave output condition at the time of non-direction to the radio wave output condition at the time of the optimal, the angle of a beam is sharpened gradually in stages.

While sharpening an angle of beam forming in stages, in order to grasp a received signal intensity for a transmitted radio wave of the AP section 211, a request for asking to send a received signal intensity is sent to all the others of the terminal devices which are not a target of beam forming (S503). In response to this request, received signal intensity (dBm) at each of the others of the terminal devices is received (S504). If the received signal intensity is not equal to or less than a predetermined threshold (for example, −80 to −90 dBm) at which a minimum communication can be secured stably (S505: NO), beam forming is performed so as to raise the stage of the degree of a sharp angle (S502). On the condition of the beam forming at this time, processing at Steps S503 to S505 is repeated again.

On the other hand, when the signal intensity becomes equal to or less than the predetermined threshold (S505: YES), beam forming is established with the degree of a sharp angle at that time. Further, in the case where a state that the other terminal device 2 does not receive operation data continues for a prescribed time period or more (S506: YES), the signal intensity of the terminal device 2 is allowed to become equal to or less the threshold, and the stage of the degree of a sharp angle is raised more (S502). In the example shown in FIG. 11, exemplification is given to the case where the two terminal devices are wirelessly connected on the remote panel mode. However, three or more terminal devices may be applied. For example, in the case of three terminal devices, the received signal intensity of each of the other two terminal devices is determined at Step S505. Then, when the received signal intensity of any one of the two terminal devices becomes equal to or less than the threshold, beam forming is established with the degree of a sharp angle at that time. Successively, in the established degree of a sharp angle of the beam forming, similarly to FIG. 8 (S130 to) etc., the image forming apparatus 10 wirelessly connects to terminal device 1 and executes animation display processing in response to a received gesture operation.

In this way, when a plurality of terminal devices are wirelessly connected to the image forming apparatus 10 on the remote panel mode, at the time of validating beam forming for one of the terminal devices, the degree of a sharp angle of beam forming is determined while considering a fall of the signal intensity of each of the other terminal devices. With this, by performing beam forming for a terminal device for which the second type operation screen is transmitted, image data can be transmitted stably in real time, and animation display can be performed smoothly. Further, for the other terminal devices, it becomes possible to secure a minimum communication speed without causing troubles in the transmission of the first type operation screen.

Fifth Embodiment

Figure 12:
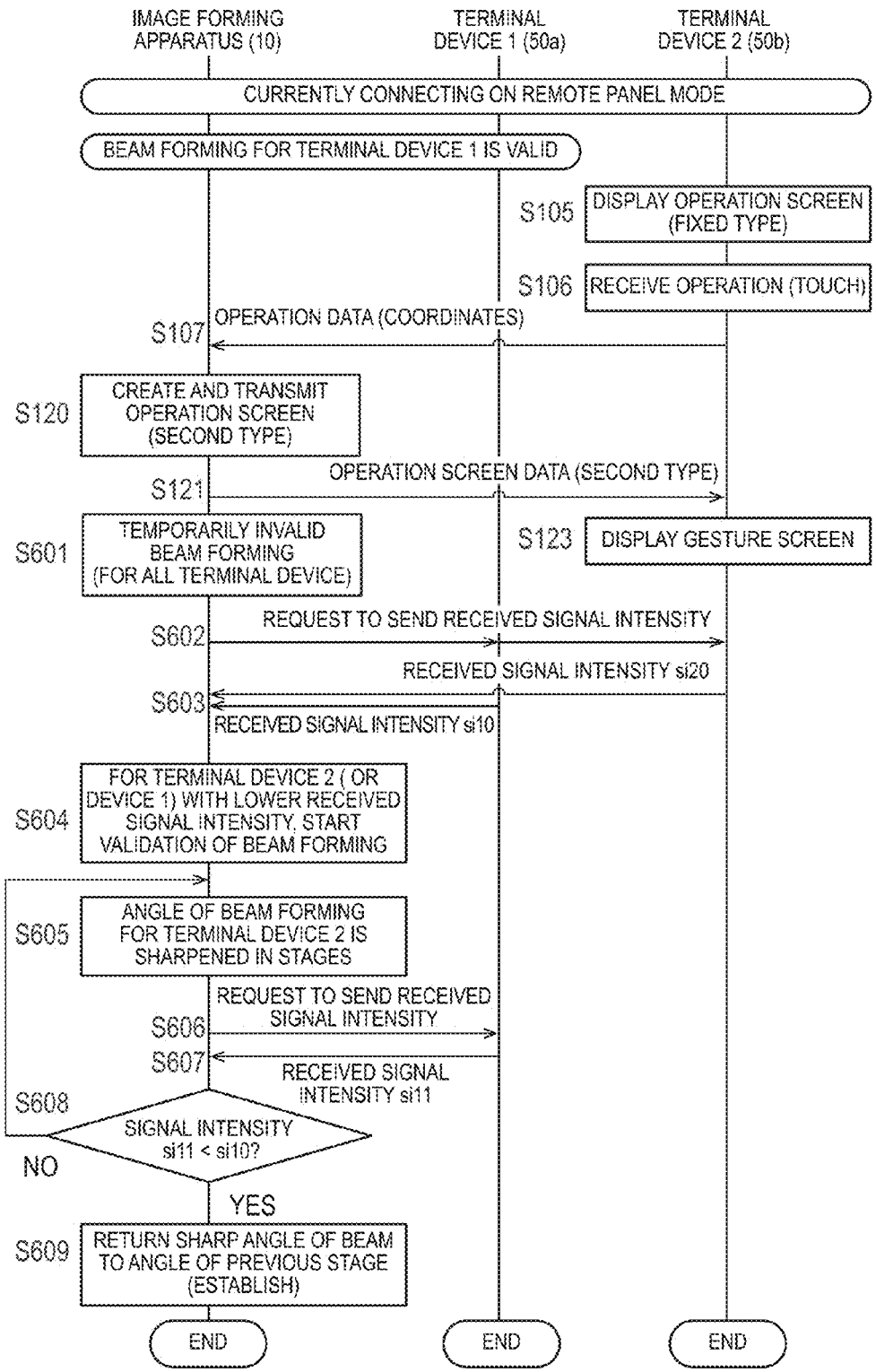
FIG. 12 is a diagram showing a temporal flow of information between the image forming apparatus and two terminal devices according to the fifth embodiment.

FIG. 12 is a diagram showing a temporal flow of information between the image forming apparatus 10 and two terminal devices 50 according to the fifth embodiment. In FIG. 12, both of the two terminal devices 1 and 2 are wirelessly connected on a remote panel mode, and beam forming is validated for the terminal device 1 of them. Under such a situation, in the case where the second type operation screen becomes to be transmitted to the terminal device 2 which is not a target of the beam forming, the propriety of validation of beam forming is determined.

In FIG. 12, by performing the processing at the same Steps S105 to S123 as those in FIG. 8, a gesture screen is displayed on the operation panel 530 of the terminal device 2. At this time, in addition to the terminal device 1, the terminal device 2 of the second terminal device also becomes a target candidate of beam forming. Accordingly, the beam forming for each of the terminal devices is invalidated temporarily, and a beam is made to non-direction (S601). In this state, a request for asking to send a received signal intensity is sent to each of the two terminal devices (S602), and in response to the request, the received signal intensity (dBm) is received (S603). Then, both the respective received signal intensities are compared with each other, and the terminal device with the lower received signal intensity is set as a target of beam forming. For example, if the received signal intensity si20 of the terminal device 2 is lower than the received signal intensity si10 of the terminal device 1, the terminal device 2 is made to a target, and validation of beam forming is started (S604).

Successively, similarly to S502 to S504 shown in FIG. 11, an angle of the beam forming is sharpened in stages for the terminal device 2 determined as a target. In parallel to this processing, in order to grasp a received signal intensity for a transmitted radio wave of the AP section 211, a request for asking to send a received signal intensity is sent to the other one of the terminal devices which does not become a target of beam forming (S606). In response to this request, a received signal intensity (dBm) at each terminal device is received (S607).

Successively, in the process of sharpening the angle of the beam forming gradually, if the received signal intensity si11 of the terminal device 1 at the time is not lower than the received signal intensity si10 received at Step S603 at the time of non-directional beam (S608: NO), the operation to sharpen the angle of the beam forming is continued (S605). On the other hand, if the received signal intensity si11 of the terminal device 1 at the time is lower than the received signal intensity si10 at the time of non-direction (S608: YES), the operation to sharpen the angle of the beam forming is returned to the degree of a sharp angle at the stage previous by one stage before the current stage, and the beam forming is established with the degree of the sharp angle (S609). Thereafter, similarly to FIG. 8 (S130 to) etc., the image forming apparatus 10 executes animation display processing in response to a received gesture operation.

When the angle of the beam forming is sharpened gradually (S605 to S608), if there is the other terminal device (the third terminal device) being connected on a remote panel mode, the processing at Steps S503 to S506 sown in FIG. 11 may be performed in parallel for the other terminal device so as to secure the communication speed of the other terminal device.

In this way, in the case where the beam forming for one of terminal devices is valid, when the second type operation screen is transmitted to another one of terminal devices and a current timing becomes a timing to validate beam forming, the beam forming is made invalid temporarily. Successively, the respective received signal intensities (si10 and si20) received from the both devices are compared with each other, and then, beam forming is validated for the terminal device with a lower received signal intensity. Thereby, for the both of the terminal devices, it becomes possible to transmit image data stably in real time, and animation display can be performed smoothly.

Sixth Embodiment

Figure 13:
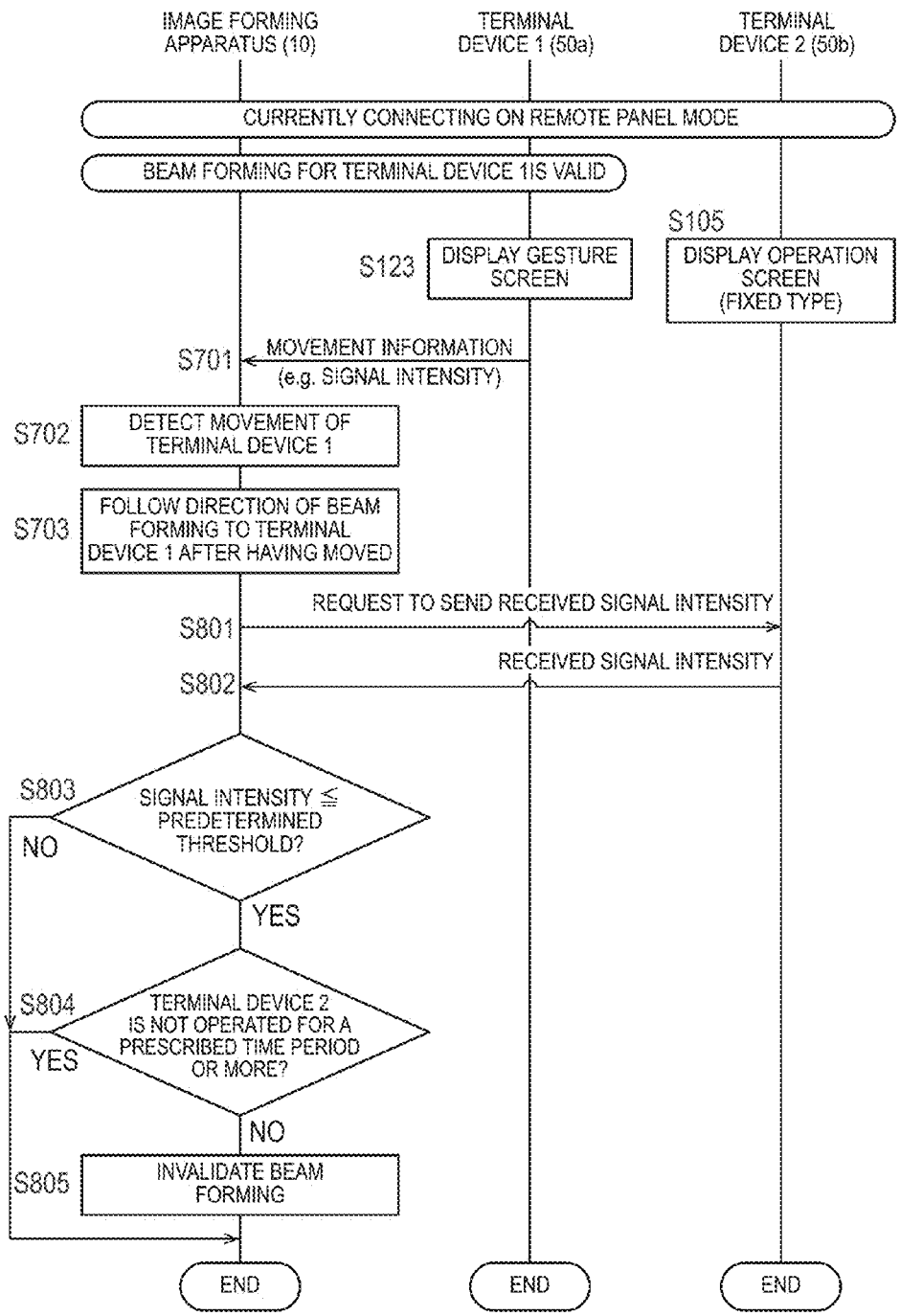
FIG. 13 is a diagram showing a temporal flow of information between the image forming apparatus and two terminal devices according to the sixth embodiment.

Next, with reference to FIG. 13, an image forming apparatus according to the sixth embodiment is described. The sixth embodiment relates to processing in the case where a terminal device for which beam forming is validated moves its geographic position. When a terminal device moves, on the previous radio wave output condition of the beam forming, the optimal received signal intensity cannot be obtained. In the present sixth embodiment, the control section 110 functions as a "movement detecting section". The control section 110 detects the geographical movement of a terminal device by monitoring a change of the received signal intensity. When detecting the movement, the direction of beam forming is made to follow such that the received signal intensity at the terminal device after having moved becomes the optimal.

In FIG. 13, by performing the processing shown in FIG. 8 etc., two terminal devices 1 and 2 are wirelessly connected to the image forming apparatus 10 on the remote panel mode, and beam forming is validated for the terminal device 1 of them.

When having moved, the terminal device 1 transmits movement information to the image forming apparatus 10. With regard to this movement information, the terminal device 1 is made to transmit the received signal intensity to the image forming apparatus 10 periodically, and movement is made to be detected from the received signal intensity. In concrete terms, in the case where the current received signal intensity falls by a prescribed value or more from the received signal intensity at the time of start of beam forming, the control section 110 of the image forming apparatus 10 detects that the terminal device has moved. Alternatively, in the case where the absolute value of a received signal intensity falls to a prescribed value or less, the control section 110 determines such that the terminal device has moved. Further, as another example, the terminal device 1 may be equipped with a module of an IC tag or GPS to detect movement at a geographic position, and movement information may be acquired from this module.

With such a technique, the image forming apparatus 10 detects the movement of the terminal device 1 (S701, S702). In the case of detecting the movement, the wireless communicating section 210 makes beam forming follow the terminal device 1 after having moved (S703). That is, based on sounding frames newly transmitted or received, the wireless communicating section 210 calculates a channel state between the terminal device 1 at the current geographic position and the AP sections 211, and then, based on this channel state, the wireless communicating section 210 readjusts the radio wave output condition output from each antenna of the AP section 211.

By doing in this way, even if the terminal device 1 has moved, beam forming can be optimized for the terminal device 1 after having moved. With this, when animation display is performed in response to a gesture operation, it becomes possible to transmit image data stably in real time, and animation can be displayed smoothly.

Further, in the case of making beam forming follow, if the received signal intensity at the other terminal device 2 seems to change, the following processing subsequent to S801 may be performed. In concrete terms, in order to grasp a received signal intensity for a transmitted radio wave of the AP section 211, a request for asking to send a received signal intensity is sent to a terminal device (S801). Successively, in response to this request, a received signal intensity (dBm) at each terminal device is received (S802). In the case where the received signal intensity is equal to or less than a predetermined threshold (for example, −80 to −90 dBm) at which a minimum communication can be secured stably (S803: YES) and a state that the terminal device 2 does not receive operation data does not continue for a prescribed time period or more (S804: NO), the beam forming is invalidated (S805)

On the other hand, in the case where the received signal intensity is not equal to or less than the predetermined threshold (S803: NO) and a minimum communication can be secured stably, or in the case where a state that the terminal device 2 does not receive operation data continues for a prescribed time period or more (S804: YES), the radio wave condition of the beam forming performed at S703 is established and the processing is ended.

By doing in this way, it is possible to secure a minimum communication speed also for the other terminal device 2, and in addition, beam forming for the terminal device 1 after having moved can be optimized.

In the above, the embodiments of the present invention are described. However, the present invention should not be limited to these embodiments. In particular, the respective procedures described in the embodiments can be combined in various ways and executed in the combination. For example, the procedures to validate beam forming and the procedures to invalidate beam forming, which are described in the first and second embodiments, can be combined with each other. Further, these procedures can be applied to the fourth to sixth embodiments.

The programs to make the image forming apparatus operate may be provided with a computer-readable recording medium, such as a USB memory, a flexible disk, and CD-ROM, or may be provided online through a network, such as Internet. In this case, usually, the programs recorded in the computer-readable recording medium may be transferred and stored in a memory and a storage. The programs may be provided, for example, as independent application software, or may be incorporated in the software of the image forming apparatus as one of the functions of the apparatus.

In addition, the present invention is prescribed with the contents described in claims, and various modifications can be made.

What is claimed is:

1. An image forming apparatus which transmits an operation screen on a remote panel mode via wireless communication to a terminal device wirelessly connected and is able to perform an operation in response to an operation instruction which is made to the operation screen and received from the terminal device, the image forming apparatus comprising:
    a network which wirelessly communicates with one or more terminal devices and is able to execute beam forming for one or more specific terminal devices, wherein the beam forming causes a signal intensity to be highest at a geographic position of the one or more specific terminal devices; and
    a processor configured:
        to create a first type operation screen to be transmitted on the remote panel mode to a terminal device wirelessly connected and a second type operation screen for which a transfer rate higher than that for the first type operation screen is requested,
        to receive an operation instruction onto an operation screen displayed on a terminal device via the network,
        to create a renewed operation screen based on the received operation instruction, and
        to transmit the renewed operation screen to the terminal device;
    wherein the second type operation screen is an operation screen capable of receiving an operation instruction with regard to a gesture operation by a user from a terminal device, and when the second type operation screen is transmitted to the terminal device via the network, beam forming is validated for the terminal device being a transmission destination.

2. The image forming apparatus described in claim 1, wherein a timing to validate the beam forming for the terminal device being a transmission destination is one of at a time when switching an operation screen to be transmitted to the terminal device to the second type operation screen; at a time when starting transmission of a series of the second type operation screen in response to the gesture operation upon receiving an operation instruction with regard to the gesture operation from the terminal device in the case of displaying the second type operation screen on the terminal device; and at a time when receiving an operation instruction with regard to start of a touch operation by the user within a display region for receiving a gesture operation from the terminal device in the case of displaying the second type operation screen on the terminal device.

3. The image forming apparatus described in claim 1, wherein in the case where only one of the terminal devices is wirelessly connected on the remote panel mode, when the beam forming is validated, an angle of the beam forming is sharpened such that a received signal intensity at the terminal device becomes the highest.

4. The image forming apparatus described in claim 1, wherein a timing to invalidate the beam forming validated for the terminal device is one of at a time when switching an operation screen to be transmitted to the terminal device from the second type operation screen to the first type operation screen; at a time when ending transmission of a series of the second type operation screen in response to a single gesture operation; and at a time when having not received an operation instruction onto the second type operation screen for a predetermined time or more from the terminal device.

5. The image forming apparatus described in claim 1, wherein a timing to validate the beam forming for the terminal device being a transmission destination is at a time when receiving an operation instruction with regard to start of a touch operation by the user within a display region for receiving a gesture operation from the terminal device in the case of displaying the second type operation screen on the terminal device, and a timing to invalidate the beam forming is at a time when receiving an operation instruction having ended the touch operation onto the display region.

6. The image forming apparatus described in claim 1, wherein while being wirelessly connected to a plurality of the terminal devices simultaneously on the remote panel mode, in the case where the beam forming is validated for one terminal device of the plurality of the terminal devices, when an angle of the beam forming is sharpened in stages for the terminal being a target, if a received signal intensity at the other terminal device not being a target falls to a predetermined threshold or less, an operation to sharpen the angle of the beam forming is stopped, and the beam forming is executed with the angle at that time for the terminal device being a target.

7. The image forming apparatus described in claim 6, wherein the terminal device at which the received signal intensity has fallen to the predetermined threshold or less is a terminal device which has not received an operation instruction for a prescribed time period or more, the received signal intensity at the terminal device is allowed to become the predetermined threshold or less, and the operation to sharpen the angle of the beam forming is continued.

8. The image forming apparatus described in claim 2, wherein when the beam forming is validated for one of a plurality of the terminal devices, if a current timing becomes the timing to validate the beam forming for more than one of the plurality of terminal devices, the beam forming is invalidated temporarily, the respective received signal intensities of the two terminal devices are compared with each other, and the beam forming is validated for one of the two terminal devices with the lower received signal intensity.

9. The image forming apparatus described in claim 8, wherein in the case where the beam forming is made to be validated for one of the two terminal devices, while the angle of the beam forming for the one terminal device is being sharpened in stages, a received signal intensity of the other terminal device is received, if the received signal intensity is lower than a received signal intensity of the other terminal device received at the time of invalidating the beam forming, the operation to sharpen the angle of the beam forming is stopped, and the beam forming is executed for the terminal device being a target with the degree of a sharp angle before the received signal intensity has become lower.

10. The image forming apparatus described in claim 1, further comprising:
a movement detecting section to detect the movement of the geographic position of the terminal device, wherein in the case where the movement detecting section determines the movement of the geographic position of the terminal device for which the beam forming is validated, the direction of the beam forming is made to follow the terminal device after having moved.

11. The image forming apparatus described in claim 10, wherein when being wirelessly connected to a plurality of the terminal devices simultaneously on the remote panel mode and making the beam forming valid for one of the plurality of the terminal devices, in the case where the movement detecting section detects the movement of the terminal device for which the beam forming is validated, if a received signal intensity at the other terminal device not being a target does not become equal to or less than a predetermined threshold, the direction of the beam forming is made to follow the terminal device after having moved.

12. The image forming apparatus described in claim 11, wherein when the direction of the beam forming is made to follow the terminal device after having moved, whether a received signal intensity at the other terminal device not being a target becomes equal to or less than the predetermined threshold or not is determined, and when the received signal intensity has fallen to the predetermined threshold or less, the beam forming is invalidated.

13. The image forming apparatus described in claim 12, wherein the terminal device at which the received signal intensity has fallen to the predetermined threshold or less when the direction of the beam forming is made to follow is a terminal device which has not received an operation instruction for a prescribed time period or more, the received signal intensity at the terminal device is allowed to become the predetermined threshold or less, and an operation to make the direction of the beam forming follow is executed.

14. A control method executed in an image forming apparatus which is able to perform operation in response to an operation instruction received via wireless communication from a terminal device wirelessly connected on a remote panel mode and includes a network capable of executing beam forming, where the beam forming causes the signal intensity to be highest at the terminal device's geographic position, the control method comprising:
establishing wireless connection on a remote panel mode with one or more terminal devices;
transmitting an operation screen to be displayed on a display surface of a terminal device to the terminal device;
receiving an operation instruction corresponding to the operation screen from the terminal device;
creating based on the operation instruction one of a first type operation screen and a second type operation screen for which a transfer rate higher than that for the first type operation screen is required;
transmitting the created operation screen to the terminal device; and
validating beam forming for the terminal device being a transmission destination in the case of transmitting the second type operation screen.

15. The control method described in claim 14, wherein in the validating the beam forming, a timing to validate the beam forming for the terminal device being a transmission destination is one of at a time when switching an operation screen to be transmitted to the terminal device to the second type operation screen; at a time when starting transmission of a series of the second type operation screen in response to a gesture operation upon receiving an operation instruction with regard to the gesture operation from the terminal device in the case of displaying the second type operation screen on the terminal device; and at a time when receiving an operation instruction with regard to start of a touch operation by the user within a display region for receiving a gesture operation from the terminal device in the case of displaying the second type operation screen on the terminal device.

16. A non-transitory computer-readable recording medium storing a program executing a control method for an image forming apparatus which is able to perform operation in response to an operation instruction received via wireless communication from a terminal device wirelessly connected on a remote panel mode and includes a network capable of executing beam forming, wherein the beam forming causes a signal intensity to be highest at the terminal device's geographic position, the control method comprising:
establishing wireless connection on a remote panel mode with one or more terminal devices;
transmitting an operation screen to be displayed on a display surface of a terminal device to the terminal device;
receiving an operation instruction corresponding to the operation screen from the terminal device;
creating based on the operation instruction one of a first type operation screen and a second type operation screen for which a transfer rate higher than that for the first type operation screen is required;
transmitting the created operation screen to the terminal device; and
validating beam forming for the terminal device being a transmission destination in the case of transmitting the second type operation screen.

* * * * *